(12) United States Patent
Nonaka et al.

(10) Patent No.: US 6,283,882 B1
(45) Date of Patent: Sep. 4, 2001

(54) HEAVY-DUTY POWER TRANSMISSION V-BELT

(75) Inventors: Keizo Nonaka; Mitsuhiko Takahashi; Hiroyuki Sakanaka, all of Kobe (JP)

(73) Assignees: Bando Chemical Industries, Ltd., Kobe; Aichi Machine Industry Co., Ltd., Nagoya, both of (JP)

( * ) Notice: Subject to any disclaimer, the term of this patent is extended or adjusted under 35 U.S.C. 154(b) by 0 days.

(21) Appl. No.: 09/414,868

(22) Filed: Oct. 8, 1999

(30) Foreign Application Priority Data

Oct. 13, 1998 (JP) .................................................. 10-290829

(51) Int. Cl.$^7$ ........................................................ F16G 5/16
(52) U.S. Cl. ............................ 474/242; 474/201; 474/243
(58) Field of Search .................................... 474/201, 242, 474/243, 245, 240, 244, 238, 237, 265

(56) References Cited

U.S. PATENT DOCUMENTS

| | | | |
|---|---|---|---|
| 4,734,085 | * | 3/1988 | Takashima et al. ............. 474/201 X |
| 5,776,023 | * | 7/1998 | Okawa et al. ........................ 474/243 |

FOREIGN PATENT DOCUMENTS

| | | |
|---|---|---|
| 05-272595 | 10/1993 | (JP) . |
| 14356 | * 1/1997 | (JP) . |
| 06-288440 | 10/1997 | (JP) . |
| 10-196739 | 7/1998 | (JP) . |
| 108124 | * 3/1999 | (JP) . |
| 63117 | * 3/1999 | (JP) . |

* cited by examiner

Primary Examiner—David A. Bucci
Assistant Examiner—Marcus Charles
(74) Attorney, Agent, or Firm—Nixon Peabody LLP; Thomas W. Cole

(57) ABSTRACT

A heavy-duty power transmission V-belt includes right and left tension members having concave parts on upper and lower faces thereof, and a large number of blocks having fitting parts for compressedly fitting the tension members therein on right and left side faces of the blocks. By compressedly fitting the tension members in the fitting parts of the blocks, the respective blocks are fixedly engaged with the tension members so as to allow the side faces thereof to be brought into contact with a groove face of the pulley. An innermost lower face is formed in an innermost portion of the fitting part of each block, and an innermost lower face angle α between the innermost lower face and a vertical plane is determined so as to have a relationship of $\beta-3<\alpha<\beta+3$ with a belt side face angle β. Such angling of the faces of the blocks improves the durability of the belt by preventing occurrence of imbalanced abrasion of the tension members, suppressing heat generation in the belt, and reducing noise of the belt even when tile belt is in use for a long period of time.

7 Claims, 10 Drawing Sheets

HEAVY-DUTY POWER TRANSMISSION V-BELT

BACKGROUND OF THE INVENTION

The present invention relates to a heavy-duty power transmission V-belt.

In conventionally well known heavy-duty power transmission V-belts, a large number of blocks are fixed on a tension member by using convex and concave engagement structures of the blocks and the tension member as is disclosed in Japanese Laid-Open Utility Model Publication Nos. 1-55344 and 6-69490 and Japanese Laid-Open Patent Publication No. 5-272595, and such heavy-duty power transmission V-belts are utilized in the field of, for example, stepless transmission. In such a conventional V-belt, the blocks are fixed on the tension member not through adhesion but through physical engagement in order to secure flexibility of the belt. The belt includes a pair of right and left tension members 1 arranged in a widthwise direction of the belt, for example, as is shown in FIG. 2. On the upper face and the lower face of each tension member 1, upper concave parts 2 and lower concave parts 3 are respectively correspondingly provided as a larger number of engaged parts arranged in the lengthwise direction of the belt. On the other hand, on the side faces of each block 7 in the widthwise direction of the belt, a pair of right and left fitting parts 8 each in the shape of a notch groove are respectively formed so as to catch the tension members 1 therein. Each of the fitting parts 8 is provided with upper convex parts 9 as upper engaging parts formed on its upper face and lower convex parts 10 as lower engaging parts formed on its lower face. By pressing the tension members 1 so as to be fit in the right and left fitting parts 8 of the respective blocks 7, the respective blocks 7 are fixedly engaged with the tension members 1.

Such a heavy-duty power transmission block V-belt in which a large number of blocks 7 are compressedly fixed on the pair of tension members 1, however, has the following problems: First, an innermost structure between the innermost portion of the fitting part 8 of the block 7 and the end of the tension member 1 closer to the center in the widthwise direction of the belt to be fit in the fitting part 8 will now be described. In order to prevent stress from being collected on the block 7, the upper and lower corners of the innermost face of the fitting part 8 and the upper and lower corners of the innermost end of the tension member 1 are inclined as is shown in FIG. 11. Furthermore, in order to reduce the stress collection, innermost angles, that is, the angles of the upper and lower corners thereof are generally set to approximately 45 degrees against a vertical plane.

However, when the belt is used for a long period of time, imbalanced abrasion is caused in the engagement part between the tension member 1 and the block 7, specifically, in an outside portion of the upper face of the tension member 1 and an inside portion of the lower face of the tension member 1 as is shown with virtual lines in FIG. 11. Due to the dimensional change derived from the imbalanced abrasion, load shares of tension cords 1b within a form holding layer 1a of the tension member 1 become ununiform, namely, the load increases toward the outside of the fitting part 8 in the tension cords 1 arranged in the widthwise direction of the tension member 1. Accordingly, a load applied to one tension cord 1b is increased so as to accelerate the fatigue of the tension cord. As a result, time until breakage of the tension cord 1b is shortened, resulting in lowering the durability of the belt.

Furthermore, in order to reduce noise of the belt, the block belt is provided with a projecting margin formed by appropriately projecting a side face of the tension member 1, that is, a rubber belt, from the side face of the block 7 (See Japanese Laid-Open Utility Model Publication No. 6-69490 and Japanese Laid-Open Patent Publication No. 5-272595). Owing to this projecting margin, the side faces of both the tension member 1 and the block 7 can come in contact with the groove face of a pulley, so that the mechanical shock caused when the block 7 meets the pulley can be absorbed and the noise can be reduced. However, when the imbalanced abrasion is caused in the tension member 1, the side face of the tension member 1 recesses from the side face of the block 7 and the projecting margin becomes minus, resulting in increasing the noise of the belt.

Assuming that one of the tension members 1 is one V-belt, the imbalanced abrasion seems to be caused by the moment M derived from directional imbalance between a force F applied to the tension member 1 by the groove face of a pulley and a force applied by the innermost face of the fitting part 8 of the block 7. The moment M is caused so as to push upward the outside portion of the tension member 1 closer to the groove face of the pulley and push downward the opposite portion thereof closer to the innermost face of the fitting part 8.

On the other hand, the blocks 7 are fixed on the tension members 1 through convex and concave engagement in the block belt. However, the engagement between the tension members 1 and the blocks 7 can be loosen, while driving the belt, due to permanent set in fatigue and abrasion of the engaged parts of the tension members 1 and abrasion of the engaging parts of the blocks 7, and the blocks 7 become rickety. As a result, the fatigue of the tension cords 1b of the tension member 1 is accelerated. Alternatively, the noise of the belt is increased due to vibration of the blocks 7.

In order to overcome these problems, in addition to the projecting margin provided to the block belt, by setting an engagement thickness of the tension member 1 to be larger than an engagement gap of the block 7, the belt is provided with a fitting margin for compressedly fitting the tension members 1 in the fitting parts 8 of the blocks 7 (see Japanese Laid-Open Utility Model Publication No. 1-155344). Thus, time until the blocks 7 and the tension members 1 start to become rickety can be postponed. However, when the fitting margin and the projecting margin are larger, there arises another problem of increase of heat generation in the belt.

Furthermore, the durability of the belt can be improved by improving accuracy in the dimensions, such as a thickness, of the tension members 1 and the blocks 7 and by setting the projecting margin and the fitting margin at an optimal level. However, when the fitting margin becomes loose to a given extent, the imbalanced abrasion is caused in the tension member 1, and hence, there is a limit in the improvement of the durability of the belt. When the belt is used under severe conditions (such as a small pulley diameter, large torque and a high temperature), the durability of the belt cannot be improved by the aforementioned means, and it is necessary to provide means for suppressing the imbalanced abrasion.

An object of the invention is improving the innermost structure of a belt between the innermost portion of the fitting part of each block and the innermost end of the tension member fit in the fitting part, improving the durability of the belt by suppressing imbalanced abrasion of the tension member, and reducing noise of the belt even in use for a long period of time by setting the projecting margin and the fitting margin large with suppressing heat generation in the belt.

SUMMARY OF THE INVENTION

In order to achieve the above-described object, in an innermost structure between an innermost portion of a fitting part of each block and an end of a tension member, an angle of an innermost lower face of the fitting part is regarded significant in this invention. Therefore, the angle of the innermost lower face is determined to have a specific relationship with an angle of the side face of the belt (which is a half of a belt angle). As a result, the durability can be improved because imbalanced abrasion is not caused in the tension member, heat generation in the belt can be suppressed even when a fitting margin and a projecting margin are rather large, and belt noise can be kept low even in use for a long period of time.

Specifically, the heavy-duty power transmission V-belt of this invention comprises two endless tension members each including a large number of upper engaged parts and lower engaged parts correspondingly provided respectively on an upper face thereof closer to a back face of the belt and on a lower face thereof closer to a bottom face of the belt; and a large number of blocks each including a fitting part for compressedly fitting the tension member therein and a contact part to be brought into contact with each groove face of a pulley formed on each side face of the blocks in a widthwise direction of the belt, and the fitting part includes an upper engaging part formed on an upper face of the fitting part to be engaged with each of the upper engaged parts and a lower engaging part formed on a lower face of the fitting part to be engaged with each of the lower engaged parts. The blocks are fixedly engaged with the tension members, with allowing both the contact parts on the side faces of the blocks and each side face of the tension members together working as each side face of the belt in the widthwise direction to be in contact with each groove face of the pulley, by fitting the tension members in the fitting parts of the blocks. Also, power is transmitted through engagement between the engaging parts of the blocks and the engaged parts of the tension members.

A lower corner of an innermost portion of the fitting part of each block in a direction for compressedly inserting the tension member is formed into an innermost lower face inclined upward to the inside of the fitting part and formed in a downward range from a position the same as or higher than a pitch line of the belt (namely, the upper edge of the innermost lower face is located in the position the same as or higher than the pitch line of the belt). Furthermore, an innermost lower face angle $\alpha$ in degrees between the innermost lower face and a vertical plane and a belt side face angle $\beta$ in degrees between the side face of each of the blocks and the vertical plane are determined to have a relationship of $\beta-3<\alpha<\beta+3$.

When the innermost lower face angle $\alpha$ of the innermost lower face of the innermost portion in the fitting part of each block is smaller than $\beta-3$ or larger than $\beta+3$, a difference between the innermost lower face angle $\alpha$ and the belt side face angle $\beta$ is too large. Therefore, heat generation is increased during drive of the belt, resulting in causing imbalanced abrasion. Accordingly, the relationship is specified within the range of $\beta-3<\alpha<\beta+3$.

This heavy-duty power transmission V-belt can exhibit the following effects: Since there is a relationship of $\beta-3<\alpha<\beta+3$ between the innermost lower face angle $\alpha$ of the innermost lower face of the innermost portion in the fitting part of each block of the belt and the belt side face angle $\beta$, the relationship between the angle of the innermost lower part of the tension member and the angle of the innermost lower face of the block can be optimized. This can reduce a moment force applied to the tension member within the fitting part of the block. As a result, the imbalanced abrasion of the tension member can be suppressed., and hence, a fatigue rate of tension cords therein can be lowered. Thus, the durability of the belt until the breakage of the tension cords can be improved.

There can be a relationship of $\alpha=\beta$ between the innermost lower face angle $\alpha$ and the belt side face angle $\beta$. Thus, the relationship between the innermost lower face angle $\alpha$ and the belt side face angle $\beta$ can be made more preferable.

Alternatively, in a heavy-duty power transmission V-belt having a similar structure to that described above, the innermost lower face can be formed in a downward range from a position lower than a pitch line of the belt, and the innermost lower face angle $\alpha$ in degrees between the innermost lower face and the vertical plane and the belt side face angle $\beta$ in degrees between the side face of each of the blocks and the vertical plane can be determined to have a relationship of $\alpha \leq \beta$.

When the innermost lower face angle $\alpha$ is larger than the belt side face angle $\beta$, forces applied to the belt cannot be balanced, and the aforementioned effects cannot be effectively attained. Specifically, when the innermost lower face of the fitting part is formed in the position lower than the pitch line of the belt, a downward force is applied from the tension cords of the tension member to the engaging parts of the blocks. Since the innermost lower face is formed to be lower than the position of the tension cords, in order not to allow a moment force to be applied to the tension member, the innermost lower face angle $\alpha$ (wedge angle) should be further smaller to balance the forces. Accordingly, the relationship between the belt side face angle $\beta$ and the innermost lower face angle $\alpha$ is $0<\alpha \leq \beta$. Specifically, when the innermost lower face angle $\alpha$ is the same as or slightly smaller than the belt side face angle $\beta$, the forces can be optimally balanced. Thus, the aforementioned effects can be attained.

In this case, the relationship between the innermost lower face angle $\alpha$ and the belt side face angle $\beta$ can be $\beta-6<\alpha$. Thus, in the innermost structure in which the innermost lower face of the fitting part is formed in the position lower than the pitch line of the belt, the relationship between the innermost lower face angle $\alpha$ and the belt side face angle $\beta$ can be made more preferable.

In the heavy-duty power transmission V-belt, a lower end of each tension member closer to the inside of the fitting part of each block is formed into a beveled innermost lower part inclined upward to the inside of the fitting part, and an innermost lower angle $\alpha$ between the innermost lower part and the vertical plane can be determined to have a relationship of $\alpha-1 \leq \alpha+3$ with the innermost lower face angle $\alpha$.

This is for the following reason: When the innermost lower angle $\alpha'$ of the tension member is large than $\alpha+3$, the innermost lower angle $\alpha'$ is too large. Therefore, the innermost lower part of the tension member cannot come in contact with the innermost lower face of the block, and the lower face of an inside portion of the tension member pushes the lower engaging part of the block so as to form a recess. This recess works as an origin for causing imbalance of forces, so that balance between the forces on the right and left sides of the belt can be lost, resulting in increasing heat generation and causing imbalanced abrasion in the belt. On the other hand, when the innermost lower angle $\alpha'$ is smaller than $\alpha-1$, the innermost lower angle $\alpha'$ is too small. As a result, when the tension member is compressedly fit in the fitting part of the block, the tension member pushes upper and lower portions of the fitting part in the upward and downward directions. Therefore, excessive stress is applied to the bases of the upper and lower portions and the block can be easily broken. Accordingly, the innermost lower angle $\alpha'$ of the innermost lower part of the tension member is determined so as to have the relationship of $\alpha-1 \leq \alpha' \leq \alpha+3$.

Furthermore, in the heavy-duty power transmission V-belt, the side face of the tension member in the widthwise direction of the belt is formed into a projecting margin projecting from the contact part on the side face of each of the blocks, and an engagement thickness between corresponding upper and lower engaged parts of the tension member can be set larger than an engagement gap between corresponding upper and lower engaging parts of each of the blocks, whereby a fitting margin is provided.

Thus, the belt having the aforementioned innermost structure can be provided with a projecting margin (a length of a portion of the tension member projecting from the side face of the block working as a contact face to be brought into contact with the groove face of a pulley) and a fitting margin (a difference between an engagement thickness of the tension member and an engagement gap of the block). In this belt, change in the sizes of the projecting margin and the fitting margin with time can be suppressed by the effect of preventing the imbalanced abrasion of the tension member, resulting in keeping low noise for a long period of time.

In addition, as compared with a belt having the same innermost structure but not having either of the fitting margin or the projecting margin, the durability can be largely improved. Specifically, the noise at the initial stage can be reduced by providing the projecting margin. Furthermore, the engagement can be prevented from loosening by providing the fitting margin, and the imbalanced abrasion of the tension member can be avoided by optimizing the innermost structure, so that the fitting margin can be kept for a long period of time and that a decreasing rate of the engagement thickness of the tension member due to the imbalanced abrasion can be lowered.

Moreover, in a conventional innermost structure, there is a limit in increasing the sizes of the projecting margin and the fitting margin because of large heat generation in the belt. However, by adopting the innermost structure of this invention, the heat generation in the belt can be suppressed even when the projecting margin and the fitting margin are rather large. Therefore, a heavy-duty power transmission V-belt with low noise can be realized. Also, it is necessary to accurately set the dimensions of the engaged and engaging parts of the tension member and the block in the conventional belt. In contrast, by adopting the innermost structure (relationship) of this invention, tolerance of the projecting margin and the fitting margin can be increased.

In the heavy-duty power transmission V-belt, an innermost upper corner of the fitting part of each block in the direction for compressedly inserting the tension member can be formed into an innermost upper face inclined downward to the inside of the fitting part. Thus, stress can be prevented from being collected on the block, resulting in elongating the life of the belt.

DETAILED DESCRIPTION OF THE INVENTION EMBODIMENT 1

Figure 2:
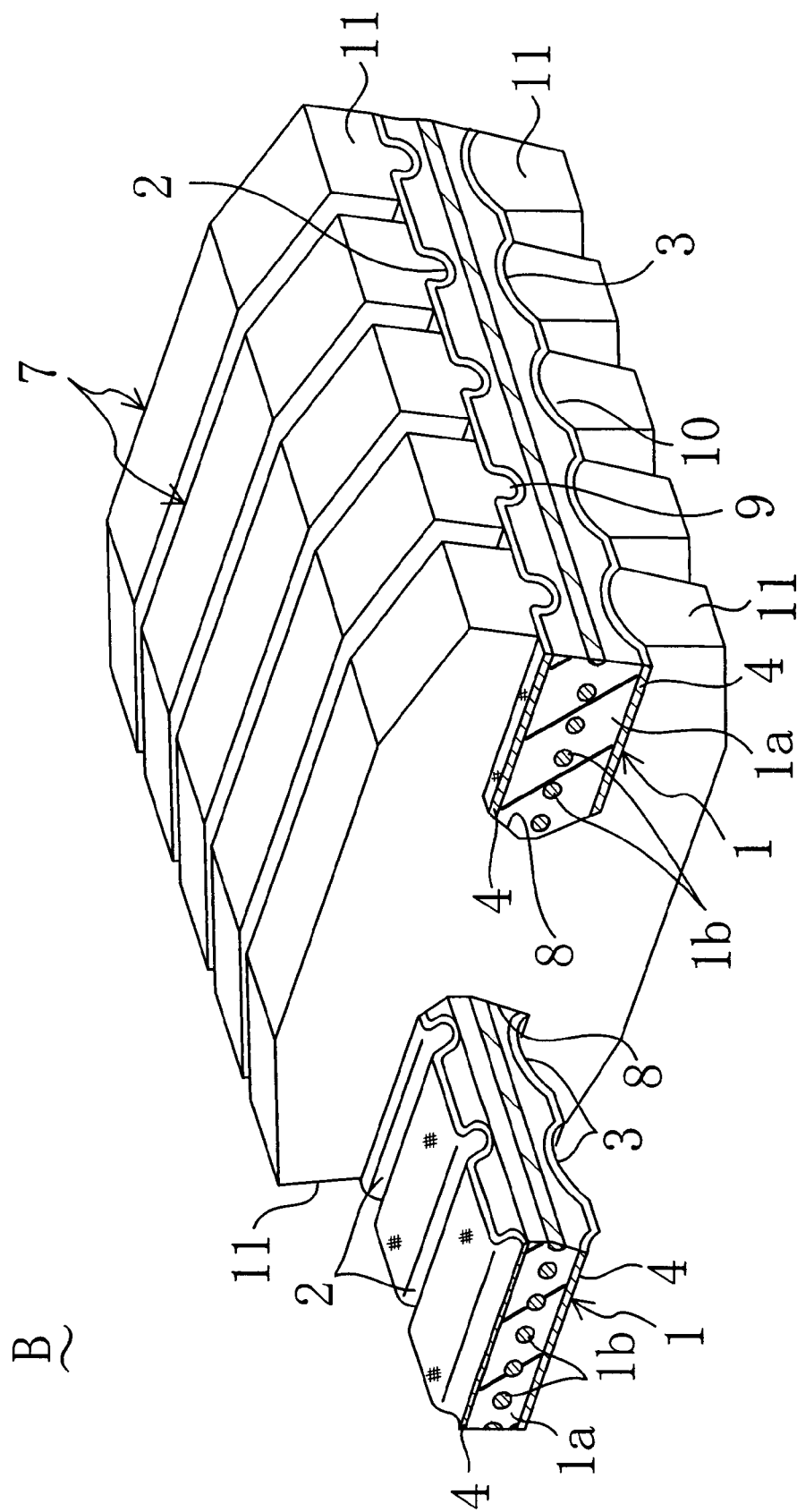
FIG. 2 is a perspective view of the heavy-duty power transmission V-belt.
Figure 4:
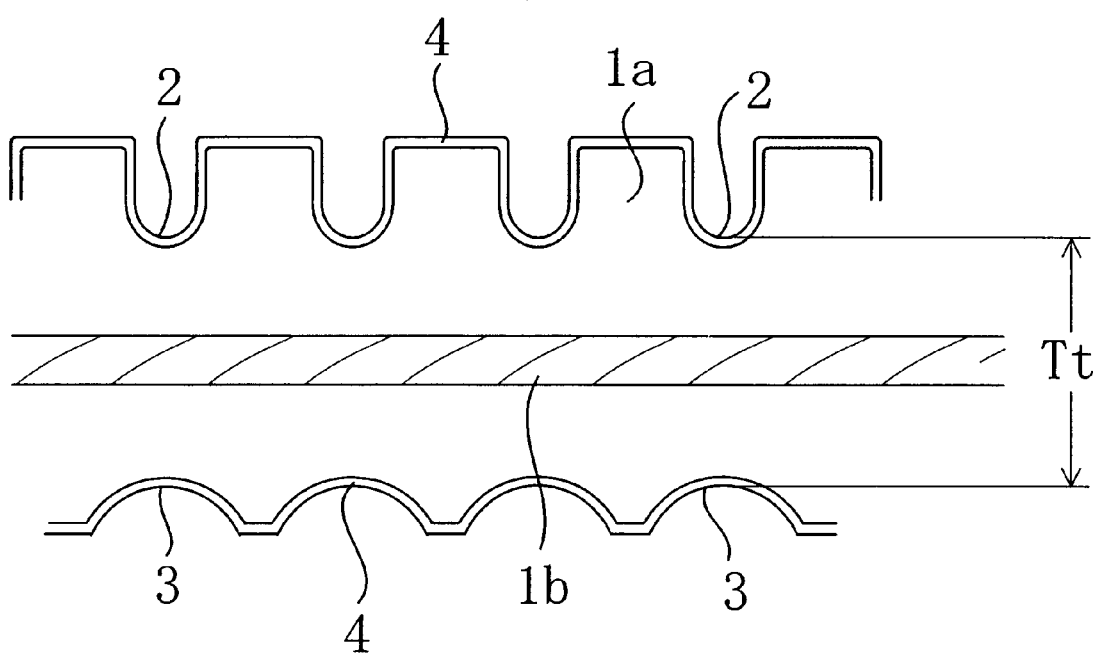
FIG. 4 is a side view of a tension member.

FIG. 2 shows a heavy-duty power transmission V-belt B according to Embodiment 1 of the invention. The belt B includes a pair of right and left endless tension members 1 and a large number of blocks 7 continuously fixedly engaged with the tension members 1 in a lengthwise direction of the belt. As is also shown in FIG. 4, each tension member 1 includes a plurality of tension cords 1*b* of aramid fiber having high strength and a high elastic modulus and spirally arranged and embedded in a form holding layer 1*a* of hard rubber. On the upper face of each tension member 1, upper concave parts 2 each in the shape of a groove serving as upper engaged parts are formed to be arranged at a given pitch correspondingly to the respective blocks 7 and extend in a widthwise direction of the belt, and on the lower face of the tension member 1, lower concave parts 3 serving as lower engaged parts are formed to be arranged at a given pitch correspondingly to the respective upper concave parts 2 and extend in the widthwise direction of the belt. Onto the upper and lower faces of each tension member 1, belt fabrics 4 are adhered for the purpose of improving the abrasion resistance.

As the hard rubber used for the form holding layer 1*a*, for example, H-NBR rubber reinforced by zinc methacrylate is further reinforced by single fiber such as aramid fiber and nylon fiber, so as to obtain hard rubber that is excellent in heat resistance and is permanently difficult to deform. The hardness of the hard rubber is required to be 75° or more when measured with a JIS-C hardness meter.

Figure 3:
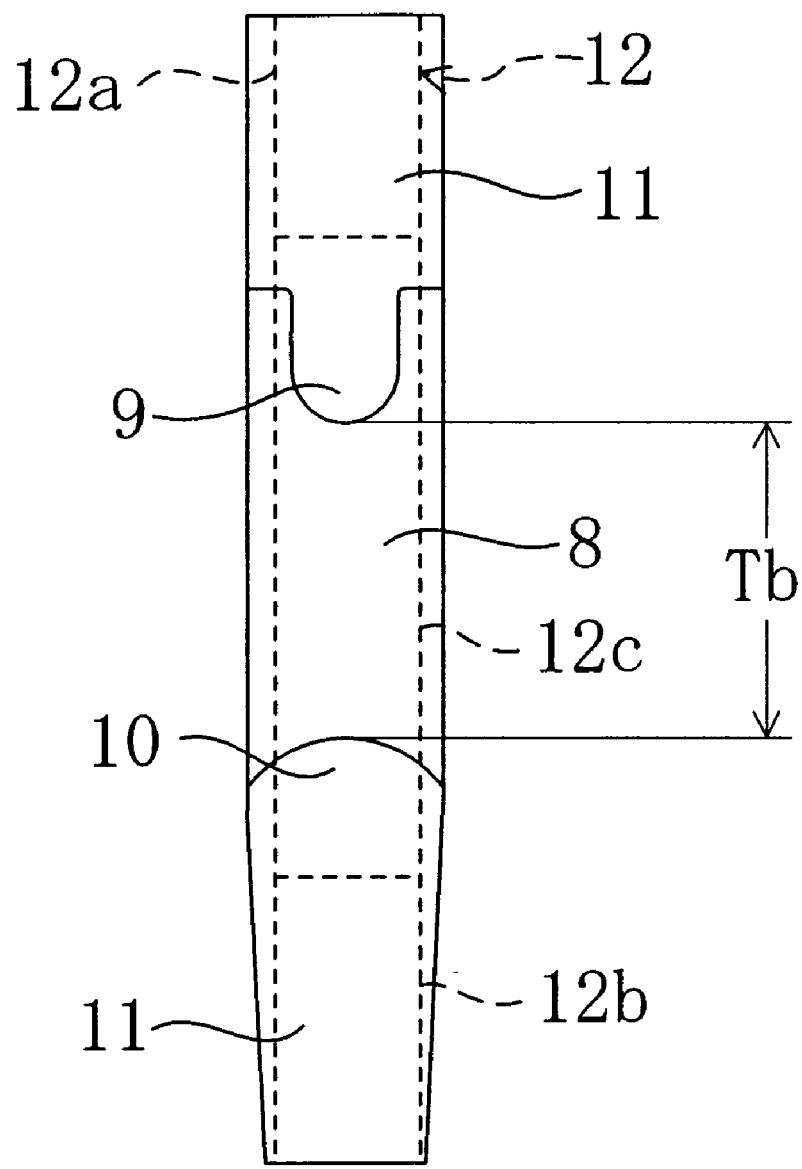
FIG. 3 is a side view of a block.

On the other hand, as is also shown in FIG. 3, each block 7 includes a fitting part 8 in the shape of a notch groove on each side face in the widthwise direction of the belt for removably fitting each tension member 1 in the widthwise direction. Each side face of the block 7 excluding the fitting part 8 serves as a contact part 11 to be in contact with the groove face of a V-pulley (not shown). A belt angle between the contact parts 11 on the right and left side faces of the block 7 accords with the angle of the groove face of the pulley. By compressedly fitting the tension members 1 in the fitting parts 8 of the respective blocks 7, the blocks 7 are continuously fixed on the tension members 1 in the lengthwise direction of the belt.

Specifically, an upper convex part 9 serving as an upper engaging part to be engaged with each upper concave part 2 on the upper face of the tension member 1 is formed on the upper face of the fitting part 8 of each block 7, and a lower convex part 10 serving as a lower engaging part to be engaged with each lower concave part 3 on the lower face of the tension member 1 is formed on the lower face of the fitting part 8 so as to be in parallel with the upper convex part 9. By engaging the upper and lower convex parts 9 and 10 of each block 7 with the upper and lower concave parts 2 and 3 of the tension member 1, the blocks 7 are compressedly fixed on the tension member 1 in the lengthwise direction of the belt. In this engagement state, the outer side faces of both the tension members 1 and the contact parts 11 corresponding to the side faces of the respective blocks 7 are in contact with the groove face of the pulley. Furthermore, through the engagement between the upper and lower convex parts 9 and 10 (the engaging parts) of the blocks 7 and the upper and lower concave parts 2 and 3 (the engaged parts) of the tension members 1, power is transmitted.

Each of the blocks 7 is made from a hard resin material. Within the block 7, a reinforcing member 12 of a lightweight aluminum alloy or the like is embedded to be positioned at substantially the center of the block 7. The reinforcing member 12 is embedded in the hard resin material and does not appear on the surface of the block 7 in, for example, the upper and lower convex parts 9 and 10 (namely, the engaging parts with the tension member 1) and the contact parts 11 on the right and left side faces (namely, the slid contact parts with the groove face of the pulley). In other words, the upper and lower convex parts and the contact parts are made from the hard resin material. The reinforcing member 12 can be exposed on the surface of the block 7 in the other parts. The reinforcing member 12 is formed substantially in the shape of H including upper and lower beams 12a and 12b extending in the widthwise direction (in the rightward and leftward direction) and a pillar 12c connecting the center parts of the beams 12a and 12b and extending in the vertical direction.

Figure 1:
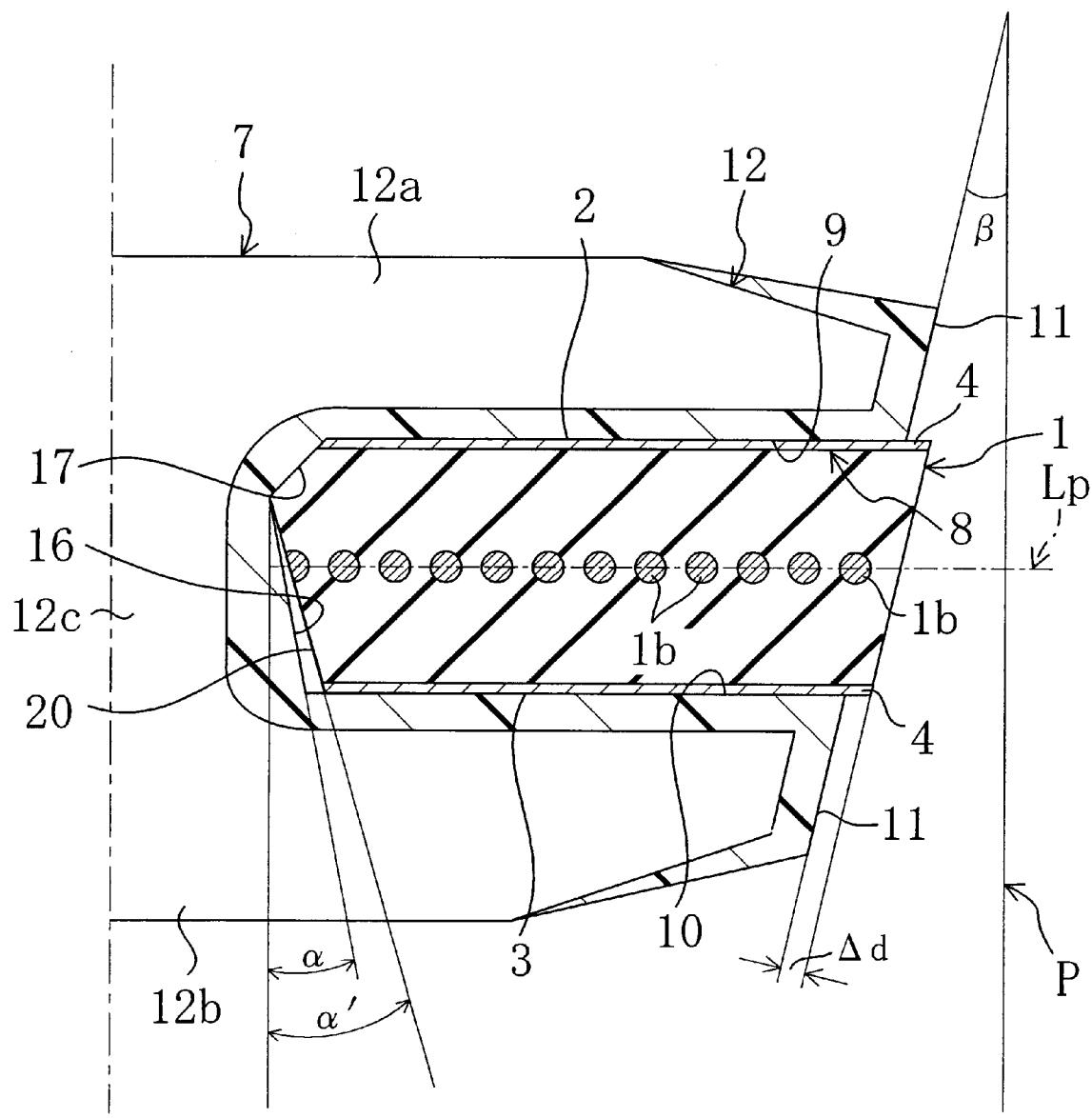
FIG. 1 is an enlarged sectional view of a heavy-duty power transmission V-belt according to Embodiment 1 of the invention.

Furthermore, as is shown in FIG. 1, the lower corner of each fitting part 8 of each block 7 disposed in the innermost portion in the direction for compressedly inserting the tension member is formed into an innermost lower face 16 inclined upward to the inside of the fitting part 8 (i.e., toward the center in the widthwise direction of the belt). The inclination of the innermost lower face 16 starts in a position higher than a pitch line Lp of the belt B (corresponding to the position of the tension cords 1b of the tension member 1), namely, the upper edge of the innermost lower face 16 is positioned at a higher level than the pitch line Lp of the belt.

An innermost lower face angle α between the innermost lower face 16 and a vertical plane P (which is parallel to a plane passing through the center in the widthwise direction of the belt B) and a belt side face angle β (corresponding to a half of the belt angle) between the plane P and the side faces of the belt B, namely, the contact parts 11 of each block 7 are determined so as to attain a relationship of $\beta-3<\alpha<\beta+3$ between them.

When there is a relationship of $\alpha \leq \beta-3$ or $\alpha \geq \beta+3$ between the innermost lower face angle α of the innermost lower face 16 and the belt side face angle β, a difference between the innermost lower face angle α and the belt side face angle β is too large. When this difference is large, more heat is generated in the belt B during drive, resulting in causing imbalanced abrasion of the tension member 1. Accordingly, these angles are set so as to attain the relationship of $\beta-3<\alpha<\beta+3$. In particular, the innermost lower face angle α is preferably equal to the belt side face angle β.

The lower end of the tension member 1 in the widthwise direction facing the innermost portion of the fitting part 8 of the block 7 is formed into a beveled innermost lower part 20 inclined upward to the inside of the fitting part 8. An innermost lower angle α' between the innermost lower part 20 and the vertical plane P is determined so as to attain a relationship of $\alpha-1\alpha-1 \leq \alpha \leq +3\alpha+3$ with the innermost lower face angle α of the block 7.

When there is a relationship of $\alpha'>\alpha+3$ between the innermost lower angle α' of the tension member 1 and the innermost lower face angle α, the innermost lower angle α' is too large. As a result, the innermost lower part 20 of the tension member 1 does not come into contact with the innermost lower face 16 of the block 7, and the lower end of the tension member 1 within the fitting part 8 pushes the lower engaging part of the block 7 so as to form a recess. This recess works as an origin for causing imbalance of forces, so that balance between the forces on the right and left sides of the belt can be lost, resulting in increasing heat generation and causing imbalanced abrasion in the belt B. On the other hand, when there is a relationship of $\alpha'<\alpha-1$, the innermost lower angle α' is too small. As a result, when the tension member 1 is compressedly fit in the fitting part 8 of the block 7, the tension member 1 pushes the upper and lower beams 12a and 12b of the reinforcing member 12 in the upward and downward directions. Therefore, excessive stress is applied to the bases of the upper and lower beams 12a and 12b and the reinforcing member 12 can be easily broken. Accordingly, the innermost lower angle α' of the innermost lower part 20 of the tension member 1 is determined so as to attain the relationship of $\alpha-1 \leq \alpha' \leq \alpha+3$.

Moreover, the innermost upper corner of the fitting part 8 of each block 7 in the direction of compressedly inserting the tension member is formed into an innermost upper face 17 inclined downward to the inside of the fitting part 8.

An engagement thickness between the upper concave part 2 and the lower concave part 3 of the tension member 1 of the hard rubber, namely, a distance between the bottom of the upper concave part 2 (specifically, the upper surface of the upper belt fabric 4) and the bottom of the corresponding lower concave part 3 (specifically, the lower surface of the lower belt fabric 4) as is shown in FIG. 4, is herein indicated as Tt. Also, an engagement gap of the block 7, namely, a distance between the lower end of the upper convex part 9 and the upper end of the lower convex part 10 as is shown in FIG. 3, is herein indicated as Tb. The engagement thickness Tt is set slightly larger than the engagement gap Tb by, for example, 0.03 through 0.15 mm (Tt>Tb). Accordingly, when the blocks are fixed on the tension member 1, the tension member 1 is compressed by the blocks 7 in the thickness direction, resulting in providing a fitting margin Tt−Tb (>0).

Furthermore, as is shown in FIG. 1, the outside edge of the tension member 1 is slightly (for example, by 0.03 through 0.15 mm) projected from the face of the contact part 11 of the resin of each block 7 on each of the left and right side faces of the belt B. Thus, a projecting margin Δd is provided. The projecting margin Δd can be freely varied by adjusting a pitch width of the tension member 1 (i.e., a width measured on the basis of the tension cords 1b) with respect to an insert pitch width of the fitting part 8 including the engaging part of the block 7 (i.e., a groove depth measured on the basis of the position of the tension cords 1b of the tension member 1 fit in the fitting part 8). Each tension member 1 is inserted with pressure into the fitting part 8 of each block 7, and it is necessary to press the tension member 1 with a force larger than a force applied by the groove face of the pulley in the actual use of the belt B in order to completely insert the tension member 1 with pressure. The projecting margin Δd can be easily measured by scanning the right and left side faces of the belt B with a contracer (device for measuring contour of cube) after assemble of the belt B.

In the belt B of Embodiment 1, the innermost lower face angle α of the innermost lower face 16 of the fitting part 8 of each block 7 is set with respect to the belt side face angle β in the range of α=β±3. Accordingly, the relationship between the angle of the innermost lower part 20 of the tension member 1 and the angle of the innermost lower face 16 of the block 7 can be optimized. As a result, the moment force applied to the tension member 1 within the fitting part 8 of the block 7 can be reduced. Therefore, the imbalanced abrasion of the tension member 1 can be suppressed, and the fatigue rate of the tension cords 1b can be reduced, resulting in improving the durability of the belt B until the breakage of the tension cords 1b.

Furthermore, since the moment force applied to the tension member 1 within the block 7 is thus reduced, a force caused in a contact face between the block 7 and the tension member 1 can be made uniform, resulting in reducing heat generation during the drive of the belt B. As one of the factors of heat generation in the belt B, the imbalanced abrasion is caused in the tension member 1, so as to move the tension member 1 in the widthwise direction, thereby generating friction heat on the face of engagement between the tension member 1 and the block 7. However, since the imbalanced abrasion of the tension member 1 is not caused in the belt B as described above, the friction heat generated on the face of engagement between the tension member 1 and the block 7 can be suppressed.

Also, the relationship between the angle of the innermost lower part 20 of the tension member 1 and the angle of the innermost lower face 16 of the block 7 is optimized so as to suppress the imbalanced abrasion of the tension member 1 in this embodiment. Accordingly, the sizes of the projecting margin Δd and the fitting margin Tt–Tb are not largely varied with time, and hence, low noise of the belt B can be kept for a long period of time. In addition, the durability of the belt B can be improved as compared with the case where the projecting margin Δd or the fitting margin Tt–Tb is not provided. In other words, owing to the projecting margin Δd, the noise of the belt can be suppressed at the initial stage. Furthermore, owing to the fitting margin Tt–Tb, the engagement between the tension member 1 and the block 7 can be prevented from loosening. Additionally, the optimization of the innermost structure can prevent the imbalanced abrasion of the tension member 1, and hence, the fitting margin Tt–Tb can be kept for a long period of time and a decreasing rate of the engagement thickness Tt of the tension member 1 due to the imbalanced abrasion can be lowered.

Moreover, according to the innermost structure of this embodiment, the heat generation in the belt B can be suppressed and noise can be reduced in the belt B even when the projecting margin Δd and the fitting margin Tt–Tb are rather large. Also, there is no need to accurately set the dimensions of the engaged and engaging parts of the tension member 1 and the block 7 as in the conventional technique, and the tolerance of the projecting margin Δd and the fitting margin Tt–Tb can be increased.

Furthermore, since the innermost upper face 17 is provided in the innermost portion in the direction of compressedly inserting the tension member 1 of the fitting part 8 of each block 7, stress can be prevented from collecting on the block 7, thereby elongating the life of the belt B.

Embodiment 2

Figure 5:
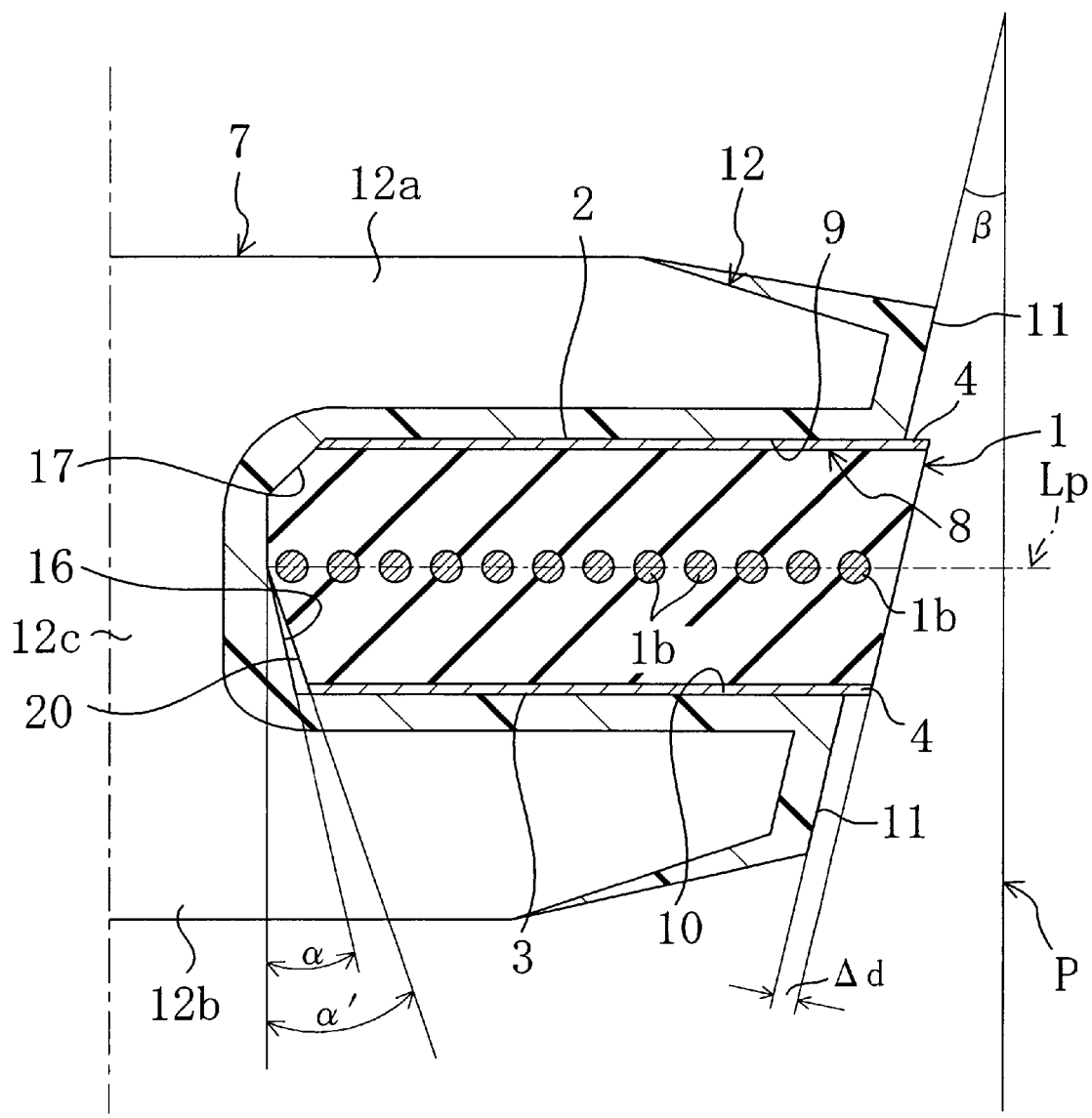
FIG. 5 is an enlarged sectional view, similar to FIG. 1, of a heavy-duty power transmission V-belt according to Embodiment 2 of the invention.

FIG. 5 shows a heavy-duty power transmission V-belt B according to Embodiment 2 of the invention. In this and other embodiments described below, like reference numerals are used to refer to like elements shown in FIGS. 1 through 4 and the description is omitted. In Embodiment 2, the inclination of an innermost lower face 16 of a fitting part 8 of each block 7 starts in the position of a pitch line Lp of the belt B, namely, the upper edge of the innermost lower face 16 is located in the same position as the pitch line Lp of the belt B. The other structure is the same as that of Embodiment 1. This embodiment can attain the same effects as those of Embodiment 1.

Embodiment 3

Figure 6:
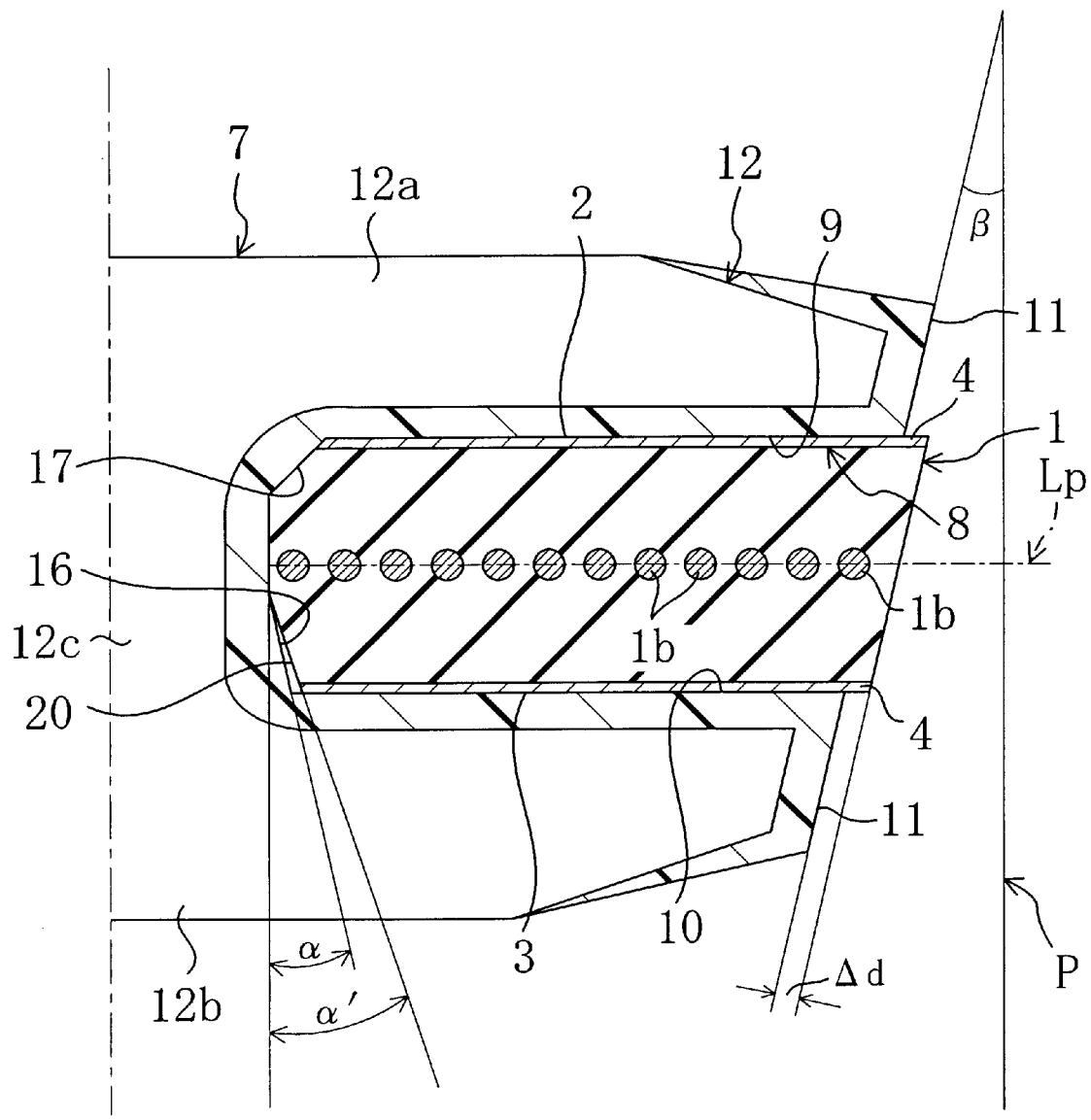
FIG. 6 is an enlarged sectional view, similar to FIG. 1, of a heavy-duty power transmission V-belt according to Embodiment 3 of the invention.

FIG. 6 shows a heavy-duty power transmission V-belt B according to Embodiment 3. In Embodiment 3, the inclination of an innermost lower face 16 of a fitting part 8 of each block 7 starts in the position lower than the position of a pitch line Lp of the belt B, namely, the upper edge of the innermost lower face 16 is located in the position lower than the pitch line Lp of the belt B.

Furthermore, an innermost lower face angle α (in degrees) between the innermost lower face 16 of the fitting part 8 of each block 7 and a vertical plane P is determined with respect to a belt side face angle ⊕ (in degrees) so as to attain a relationship of 0<α≦β.

Specifically, when the innermost lower face 16 of the fitting part 8 is formed in the position lower than the pitch line Lp of the belt B. a downward force is applied from tension cords 1b of a tension member 1 to the engaging part of the block 7. Since the innermost lower face 16 is positioned to be lower than the tension cords 1b, in order not to allow the moment force to be applied to the tension member 1, forces cannot be balanced without further decreasing the wedge angle α of the innermost lower face 16. When the innermost lower face angle α of the innermost lower face 16 within the fitting part 8 of the block 7 is larger than the belt side face angle β, the forces cannot be balanced, and hence, the aforementioned effects cannot be effectively exhibited. Accordingly, there should be a relationship of 0<α≦β between the belt side face angle β and the innermost lower face angle α, and optimal balance can be obtained when the innermost lower face angle α is slightly smaller than the belt side face angle β. In addition, in the structure where the innermost lower face 16 of the fitting part 8 is formed in the position lower than the pitch line Lp of the belt B, a further preferable relationship between the innermost lower face angle α and the belt side face angle β is β−6<α.

The other structure is the same as that of Embodiment 1, and this embodiment also attains the same effects as those of Embodiment 1.

Embodiment 4

Figure 7:
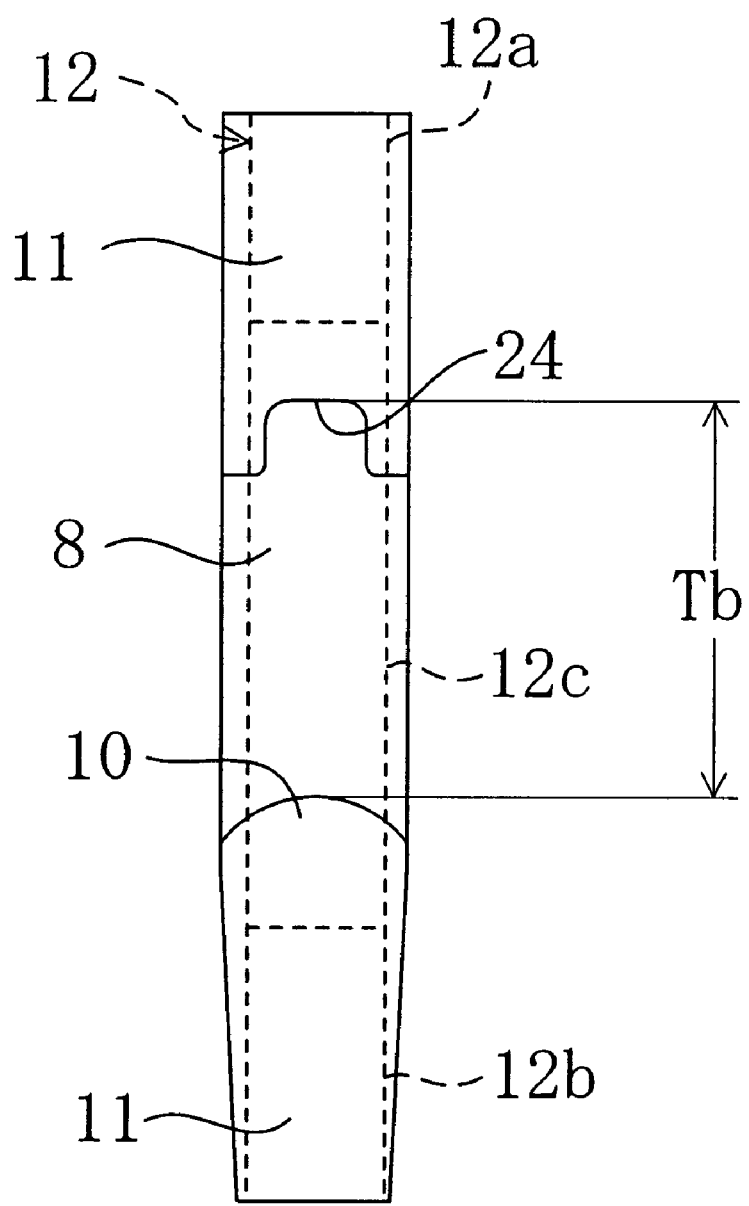
FIG. 7 is a side view, similar to FIG. 3, of a block of a heavy-duty power transmission V-belt according to Embodiment 4 of the invention.
Figure 8:
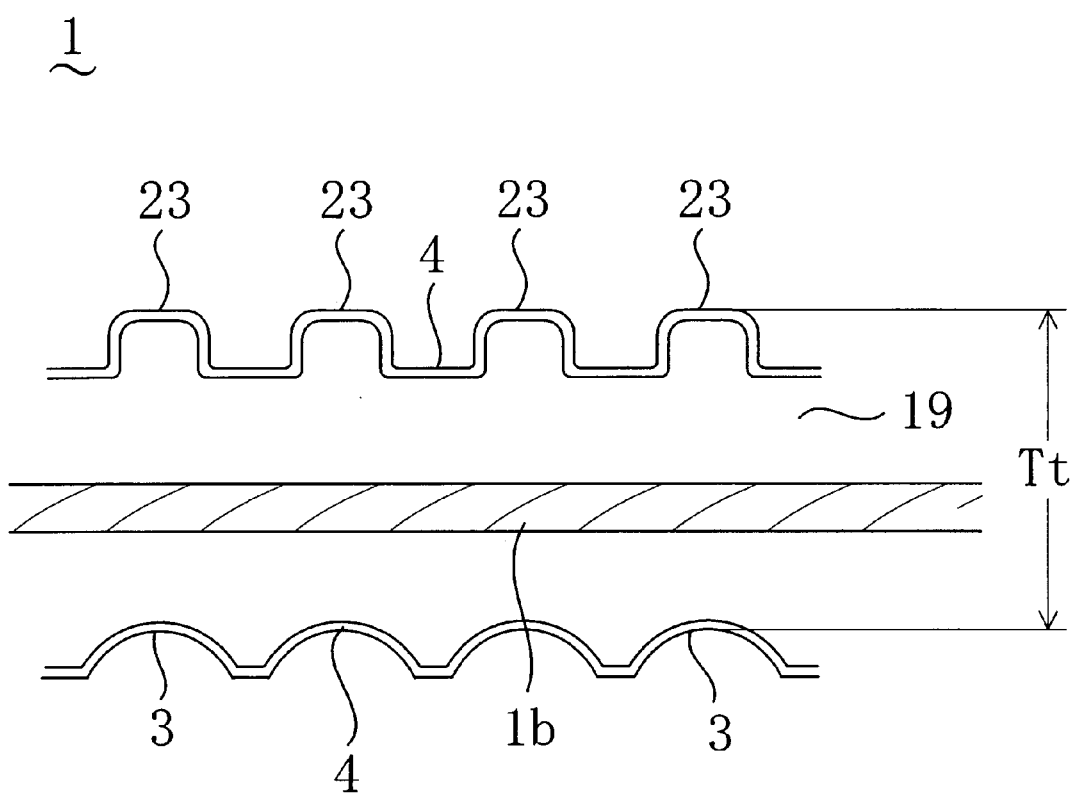
FIG. 8 is a side view, similar to FIG. 4, of a tension member of the heavy-duty power transmission V-belt of Embodiment 4.

FIGS. 7 and 8 show a heavy-duty power transmission V-belt according to Embodiment 4 of the invention. In Embodiments 1 through 3, the upper concave part 2 is formed on the upper face of the tension member 1 as an engaged part and the upper convex part 9 is formed on the upper face of the fitting part 8 of each block 7 as an engaging part to be engaged with the upper concave part 2 of the tension member 1. In contrast, in this embodiment, an upper convex part 23 is formed on the upper face of a tension member 1 as an engaged part and an upper concave part 24 is formed on the upper face of a fitting part 8 of each block 7 as an engaging part to be engaged with the upper convex part 23 of the tension member 1.

An engagement thickness of the tension member 1, namely, a distance between the tip of the upper convex part 23 (upper surface of an upper belt fabric 4) and the bottom of the corresponding lower concave part 3 (lower surface of the lower belt fabric 4) as is shown in FIG. 8, is herein indicated as Tt. An engagement gap of the block 7, namely, a distance between the bottom of the upper concave part 24 of the block 7 and the tip of the corresponding lower convex part 10 as is shown in FIG. 7, is herein indicated as Tb. The engagement thickness Tt is set to be slightly larger than the engagement gap Tb (Tt>Tb). Accordingly, in fixing the block 7 onto the tension member 1, the tension member 1 is compressed in the thickness direction by the block 7, resulting in providing a fitting margin Tt–Tb. The other structure is the same as that of Embodiment 1.

Accordingly, Embodiment 4 can attain the same effects as those of Embodiment 1.

In addition, a convex part serving as an engaged part can be formed on the lower face of the tension member 1 and a lower concave part serving as an engaging part to be engaged with the lower convex part on the lower face of the tension member 1 can be formed on the lower face of the fitting part 8 of each block 7. Specifically, the upper and lower faces of the tension member 1 are provided with a large number of upper and lower engaged parts extending in the lengthwise direction in a corresponding manner, and each of the blocks 7 is provided with the fitting part in which the tension member 1 is compressedly fit. Furthermore, the upper face of the fitting part is provided with the upper engaging part to be engaged with the upper engaged part of the tension member 1, and the lower face of the fitting part is provided with the lower engaging part to be engaged with the lower engaged part of the tension member 1. Then, the blocks 7 and the tension members 1 are assembled through engagement between the engaging parts and the engaged parts.

Next, specific examples will be described. As a heavy-duty power transmission V-belt, a block belt with a belt angle of 26° (therefore, with a belt side face angle β of 13°), a block width at the belt line of 25 mm, a pitch between blocks along the lengthwise direction of 3 mm, a block thickness of 2.95 mm and a belt length of 612 mm is fabricated. Each block is made from a phenol resin in which a reinforcing member of a light-weight high-strength aluminum alloy with a thickness of 2 mm is inserted.

Two types of block belts having this structure are fabricated with the innermost lower face angle α (in degrees) between the innermost lower face within the fitting part of each block and the vertical plane, the innermost lower angle α' of the innermost lower part of the tension member, the projecting margin and the fitting margin varied. Specifically, one type includes block belts of Examples 1 through 4 according to the invention and Comparative Examples 1 through 6 in which the innermost lower face of the fitting part is formed in the position lower than the pitch line (namely, the position of the tension cords), and the other type includes block belts of Examples 5 through 8 according to the invention and Comparative Examples 7 through 10 in which the innermost lower face of the fitting part is formed in the position the same as or higher than the pitch line.

Figure 9:
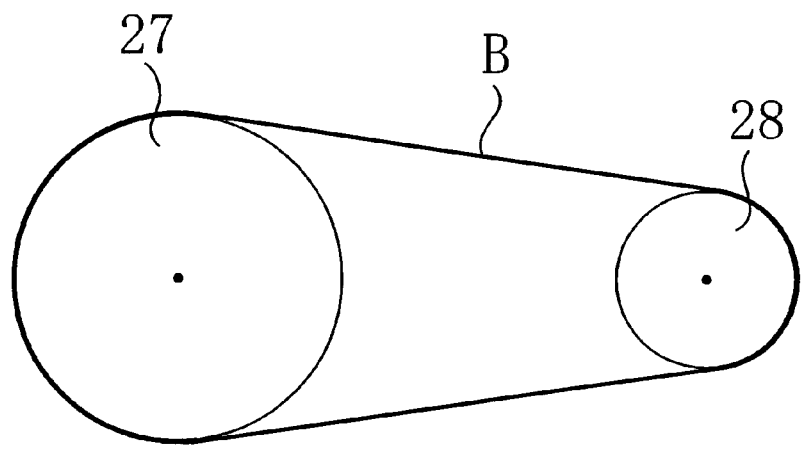
FIG. 9 is a schematic diagram for showing a durability test apparatus for a belt.

Each of the belts is subjected to a durability drive test, in which a belt temperature and belt noise are measured at the initial stage of the drive and after a predetermined time after starting the drive. The durability drive test is carried out under the following conditions: As is shown in FIG. 9, the belt B of each example is wound around a driving pulley 27 with a diameter of 120 mm and a driven pulley 28 with a diameter of 60 mm. The driving pulley 27 is driven with driving torque of 73 N·m at a rotating speed of 6000 rpm at an ambient temperature of 90° C., so as to examine the durability of the belt. The belt temperature is measured with a non-contact thermometer on the belt side face (the side face of the tension member).

Figure 10:
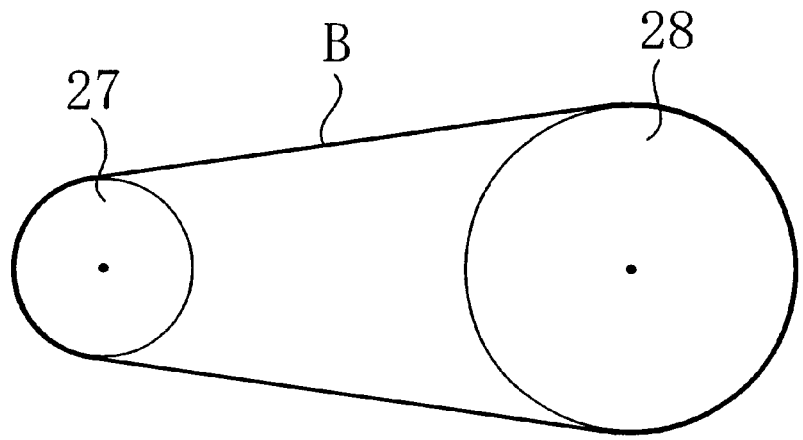
FIG. 10 is a schematic diagram for showing a noise test apparatus for a belt.
Figure 11:
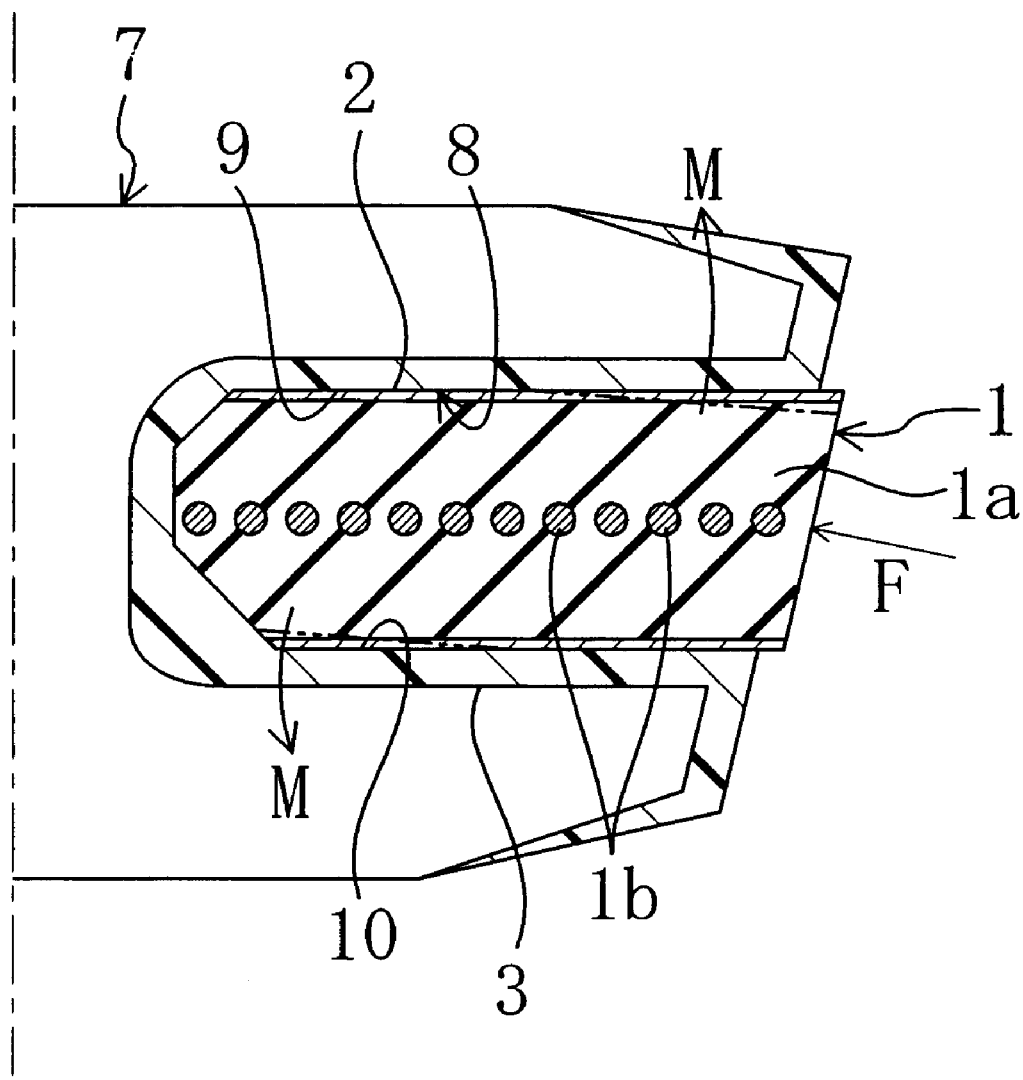
FIG. 11 is a diagram for illustrating mechanism of occurrence of imbalanced abrasion in a tension member.

The noise test for the belts is conducted by using a sound level meter after taking out the belt from the drive test apparatus at respective evaluation time. Specifically, as is shown in FIG. 10, each belt B is wound around a driving pulley 27 with a diameter of 60 mm and a driven pulley 28 with a diameter of 120 mm. A microphone is placed in a position on a plane passing through the axes of rotation of the driving and driven pulleys 27 and 28, away from the driving pulley 27 toward the driven pulley 28 by 50 mm and away from the driving pulley 27 by 100 mm. Then, the driving pulley 27 is driven at a rotating speed of 2500 rpm with no load of the driven pulley 28 at room temperature, during which noise is measured. The results of the tests are shown in Table 1 (Examples 1 through 8), Table 2 (Comparative Examples 1 through 5) and Table 3 (Comparative Examples 6 through 10).

TABLE 1

| | | Example | | | | | | | |
|---|---|---|---|---|---|---|---|---|---|
| | | 1 | 2 | 3 | 4 | 5 | 6 | 7 | 8 |
| β | | 13 | 13 | 13 | 13 | 13 | 13 | 13 | 13 |
| α | | 13 | 10 | 10 | 7 | 15 | 13 | 13 | 11 |
| α' | | 15 | 12 | 12 | 8 | 16 | 14 | 14 | 12 |
| Fitting margin (mm) | | 0.06 | 0.06 | 0.14 | 0.06 | 0.06 | 0.06 | 0.14 | 0.10 |
| Projecting margin (mm) | | 0.05 | 0.00 | 0.14 | 0.05 | 0.07 | 0.00 | 0.14 | 0.10 |
| Noise (dB) | Initial | 78 | 86 | 76 | 78 | 78 | 85 | 75 | 77 |
| | 150 H | 83 | 86 | 79 | 84 | 82 | 85 | 78 | 81 |
| | 250 H | 87 | 87 | 84 | 89 | 85 | 86 | 83 | 85 |
| Belt temperature (° C.) | Initial | 121 | 118 | 125 | 123 | 110 | 100 | 124 | 109 |
| | 50 H | 102 | 101 | 115 | 110 | 98 | 98 | 110 | 99 |
| | 150 H | 97 | 95 | 97 | 105 | 95 | 94 | 95 | 97 |
| | 250 H | 98 | 93 | 95 | 102 | 92 | 93 | 93 | 96 |
| | 350 H | 95 | 92 | 95 | 101 | 93 | 93 | 93 | 96 |
| | 500 H | 94 | 91 | 94 | 100 | 94 | 92 | 92 | 97 |
| Durability | Time | 500 H | 500 H | 500 H | 500 H | 500 H | 500 H | 500 H | 500 H |
| | Breakage | OK | OK | OK | OK | OK | OK | OK | OK |
| | | No imbalanced abrasion | No imbalanced abrasion | No imbalanced abrasion | No imbalanced abrasion | No imbalanced abrasion | No imbalanced abrasion | No imbalanced abrasion | No imbalanced abrasion |

TABLE 2

|  |  | Comparative Example | | | | |
| --- | --- | --- | --- | --- | --- | --- |
|  |  | 1 | 2 | 3 | 4 | 5 |
| β | | 13 | 13 | 13 | 13 | 13 |
| α | | 45 | 30 | 15 | 45 | 10 |
| α' | | 47 | 32 | 17 | 47 | 15 |
| Fitting margin (mm) | | 0.06 | 0.06 | 0.07 | 0.14 | 0.06 |
| Projecting margin (mm) | | 0.06 | 0.05 | 0.05 | 0.14 | 0.05 |
| Noise (dB) | Initial | 78 | 77 | 78 | 76 | 78 |
| | 150 H | 91 | 90 | 89 | 87 | 89 |
| | 250 H | 95 | 93 | 92 | 92 | 92 |
| Belt temperature (° C.) | Initial | 125 | 124 | 123 | 145 | 124 |
| | 50 H | 115 | 117 | 115 | 127 | 118 |
| | 150 H | 113 | 114 | 116 | 122 | 117 |
| | 250 H | 110 | 112 | 111 | 120 | 112 |
| | 350 H | 125 | 122 | 117 | 121 | 111 |
| | 500 H | — | — | — | — | — |
| Durability | Time | 360 H | 372 H | 460 H | 430 H | 406 H |
| | Breakage | cut | cut | cut | cut | cut |
| | | Large imbalanced abrasion | Large imbalanced abrasion | Imbalanced abrasion occurs | Large imbalanced abrasion | |

TABLE 3

|  |  | Comparative Example | | | | |
| --- | --- | --- | --- | --- | --- | --- |
|  |  | 6 | 7 | 8 | 9 | 10 |
| β | | 13 | 13 | 13 | 13 | 13 |
| α | | 10 | 20 | 13 | 13 | 20 |
| α' | | 8 | 21 | 17 | 11 | 21 |
| Fitting margin (mm) | | 0.06 | 0.06 | 0.06 | 0.07 | 0.14 |
| Projecting margin (mm) | | 0.05 | 0.06 | 0.05 | 0.04 | 0.14 |
| Noise (dB) | Initial | 77 | 77 | 77 | 78 | 76 |
| | 150 H | — | 87 | 87 | 83 | 85 |
| | 250 H | — | 90 | 91 | — | 90 |
| Belt temperature (° C.) | Initial | 127 | 116 | 116 | 121 | 135 |
| | 50 H | 100 | 114 | 113 | 98 | 128 |
| | 150 H | — | 110 | 108 | 94 | 126 |
| | 250 H | — | 105 | 105 | — | 120 |
| | 350 H | — | 107 | 104 | — | 121 |
| | 500 H | — | — | — | — | — |
| Durability | Time | 68 H | 480 H | 475 H | 187 H | 487 H |
| | Breakage | Block broken | cut Imbalanced abrasion occurs | cut Imbalanced abrasion occurs | Block broken | cut Imbalanced abrasion occurs |

According to the results shown in Tables 1 through 3, the belt heat generation is small, the imbalanced abrasion of the tension member is not caused and the belt is not broken during drive up to 500 hours in any of Examples 1 through 8.

In contrast, in the block belts of Comparative Examples 1 through 4, 7 and 10, the relationship between the innermost lower face angle α and the belt side face angle β is out of the range specified in this invention. Therefore, the imbalanced abrasion is caused and the belt is broken within 500 hours. In the block belts of Comparative Examples 4 and 10, the engagement thickness of the tension member is enlarged to increase the fitting margin. Therefore, the belt heat generation is large at the initial stage, the belt (the tension member) is broken within 500 hours, and the noise becomes larger with time.

Furthermore, in the block belts of Comparative Examples 5, 6, 8, and 9, the relationship between the innermost lower face angle α and the innermost lower angle α' is out of the range specified in this invention. In this case, when the innermost lower angle α' is much larger than the innermost lower face angle α, the imbalanced abrasion is caused in the tension member, and the effect attained owing to the relationship between the innermost lower face angle α and the belt side face angle β is reduced and the durability of the belt is lowered. On the other hand, when the innermost lower angle α' is much smaller than the innermost lower angle α, the function of the tension member as a wedge compressedly inserted into the block is so enhanced that the force applied to the bases of the beams of the block becomes large, resulting in early breakage of the block.

In the block belts of Examples 2 and 6, no projecting margin is provided. In this case, satisfactory results can be obtained except that noise is larger at the initial stage than in the block belts of other Examples. In the block belts of Examples 3 and 7, the projecting margin and the fitting margin are large, and satisfactory results can be obtained except that heat generation is larger at the initial stage than in the block belts of other Examples. When the block belts of Examples 3 and 7 are compared with those of Comparative Examples 4 and 10 in which the projecting margin and the fitting margin are similarly large, the heat generation at the initial stage is much smaller in the belts of Examples 3 and 7. Also, the block belts of Examples 2 and 6 have the lowest noise after the drive.

As is obvious from these Examples and Comparative Examples, when the innermost lower structure is optimized with respect to the belt side face angle and the relationship between the innermost lower face angle of the block and the innermost lower angle of the tension member is set within the range specified in this invention, it is possible to provide a belt that is free from the imbalanced abrasion of the tension member, has small heat generation during the drive, has excellent durability and causes small noise because of a projecting margin kept for a long period of time.

Moreover, the test results reveal that even when the projecting margin and the fitting margin are set rather large, it is possible to provide a belt in which the heat generation is difficult to increase, the effect to reduce noise owing to the projecting margin and the fitting margin can be positively utilized, and merely small noise is caused.

What is claimed is:

1. A heavy-duty power transmission V-belt comprising:
   two endless tension members each including a large number of upper engaged parts and lower engaged parts correspondingly provided respectively on an upper face thereof closer to a back face of said belt and on a lower face thereof closer to a bottom face of said belt; and
   a large number of blocks each including a fitting part for compressedly fitting said tension member therein and a contact part to be brought into contact with each groove face of a pulley formed on each side face of said blocks in a widthwise direction of said belt, said fitting part including an upper engaging part formed on an upper face of said fitting part to be engaged with each of said upper engaged parts and a lower engaging part formed on a lower face of said fitting part to be engaged with each of said lower engaged parts,
   wherein said blocks are fixedly engaged with said tension members, with allowing both said contact parts on the side faces of said blocks and each side face of said tension members together working as each side face of said belt in the widthwise direction to be in contact with each groove face of the pulley, by fitting said tension members in said fitting parts of said blocks, whereby power is transmitted through engagement between said engaging parts of said blocks and said engaged parts of said tension members,
   a lower corner of an innermost portion of said fitting part of each block in a direction for compressedly inserting each of said tension members is formed into an innermost lower face inclined upward to the inside of said fitting part and formed in a downward range from a position the same as or higher than a pitch line of said belt, and
   an innermost lower face angle $\alpha$ in degrees between said innermost lower face and a vertical plane and a belt side face angle $\beta$ in degrees between the side face of each of said blocks and said vertical plane are determined to have a relationship of $\beta-3<\alpha<\beta+3$.

2. The heavy-duty power transmission V-belt of claim 1, wherein said innermost lower face angle $\alpha$ and said belt side face angle $\beta$ have a relationship of $\alpha=\beta$.

3. The heavy-duty power transmission V-belt of claim 1, wherein a lower end of each of said tension members closer to the inside of said fitting part of each block is formed into a beveled innermost lower part inclined upward to the inside of said fitting part, and
   an innermost lower angle $\alpha'$ between said innermost lower part and said vertical plane is determined to have a relationship of $\alpha-1\leq\alpha'\leq\alpha'+3$ with said innermost lower face angle $\alpha$.

4. A heavy-duty power transmission V-belt comprising:
   an endless tension member including a large number of upper engaged parts and lower engaged parts correspondingly provided respectively on an upper face thereof closer to a back face of said belt and on a lower face thereof closer to a bottom face of said belt; and
   a large number of blocks each including a fitting part for compressedly fitting said tension member therein and a contact part to be brought into contact with a groove face of a pulley formed on a side face thereof in a widthwise direction of said belt, said fitting part including an upper engaging part formed on an upper face of said fitting part to be engaged with each of said upper engaged parts and a lower engaging part formed on a lower face of said fitting part to be engaged with each of said lower engaged parts,
   wherein said blocks are fixedly engaged with said tension member, with allowing both said contact parts on the side faces of said blocks and a side face of said tension member together working as a side face of said belt in the widthwise direction to be in contact with the groove face of the pulley, by fitting said tension member in said fitting parts of said blocks, whereby power is transmitted through engagement between said engaging parts of said blocks and said engaged parts of said tension member,
   a lower corner of an innermost portion of said fitting part of each block in a direction for compressedly inserting said tension member is formed into an innermost lower face inclined upward to the inside of said fitting part and formed in a downward range from a position lower than a pitch line of said belt, and
   an innermost lower face angle in degrees between said innermost lower face and a vertical plane and a belt side face angle $\beta$ in degrees between the side face of each of said blocks and said vertical plane are determined to have a relationship of $\alpha\leq\beta$.

5. The heavy-duty power transmission V-belt of claim 4, wherein said innermost lower face angle $\alpha$ and said belt side face angle $\beta$ have a relationship of $\beta-6<\alpha$.

6. The heavy-duty power transmission V-belt of any of claims 1–2, 4 and 5,
   wherein the side face of said tension member in the widthwise direction of said belt is formed into a projecting margin projecting from said contact part on the side face of each of said blocks, and
   an engagement thickness between corresponding upper and lower engaged parts of said tension member is set larger than an engagement gap between corresponding upper and lower engaging parts of each of said blocks, whereby a fitting margin is provided.

7. The heavy-duty power transmission V-belt of any of claims 1–2, 4 and 5,
   wherein an innermost upper corner of said fitting part of each block in the direction for compressedly inserting said tension member is formed into an innermost upper face inclined downward to the inside of said fitting part.

* * * * *